W. D. FRERICHS.
APPARATUS FOR MOLDING CLAY ARTICLES.
APPLICATION FILED FEB. 15, 1908.

986,701.

Patented Mar. 14, 1911.

W. D. FRERICHS.
APPARATUS FOR MOLDING CLAY ARTICLES.
APPLICATION FILED FEB. 15, 1908.

986,701.

Patented Mar. 14, 1911.

2 SHEETS—SHEET 2.

WITNESSES

INVENTOR
William D. Frerichs
BY
ATTORNEY

UNITED STATES PATENT OFFICE.

WILLIAM D. FRERICHS, OF TOTTENVILLE, NEW YORK, ASSIGNOR TO ATLANTIC TERRA COTTA COMPANY, A CORPORATION OF NEW YORK.

APPARATUS FOR MOLDING CLAY ARTICLES.

986,701. Specification of Letters Patent. Patented Mar. 14, 1911.

Application filed February 15, 1908. Serial No. 416,007.

*To all whom it may concern:*

Be it known that I, WILLIAM D. FRERICHS, a citizen of the United States, and a resident of Tottenville, borough of Richmond, county of Richmond, and State of New York, have invented certain new and useful Improvements in Apparatus for Molding Clay Articles, of which the following is a specification.

This invention relates to improvement in the apparatus for manufacturing clay or terra cotta for building purposes, and the invention consists in the improved method, and the apparatus set forth in and falling within the scope of the appended claims.

As is well known, in the manufacture of terra cotta or clay blocks, such as are used for architectural purposes, it is the practice, in order to secure a hollow block of the required strength, to mold the block so that it embraces strengthening webs or partitions. In modern practice these blocks are manufactured by means of a press or machine, and in my earlier Patent No. 713,562 dated November 11, 1902, I have shown a machine especially designed for the making of these terra cotta or clay blocks.

In the present invention, by the use of my improved apparatus, the blocks are made with facility and at a minimum expenditure of cost and labor and at the same time the partitions of the block are formed to possess maximum compactness, durability and strength.

Another feature of advantage incident to the present invention is that when the material is placed in the mold and the former or plunger moved into contact therewith, any surplus material, instead of being pushed or forced toward the center of the block, thereby possibly tending to cause defective webs or partitions, such material is forced toward the edge of the receptacle or mold-box, and flows over the top of such box so that it may be readily and easily removed by any suitable means such as by drawing a wire around the edge of the mold. This prevents the surplus clay from clogging the plunger, or from causing defective blocks.

Figure 1:
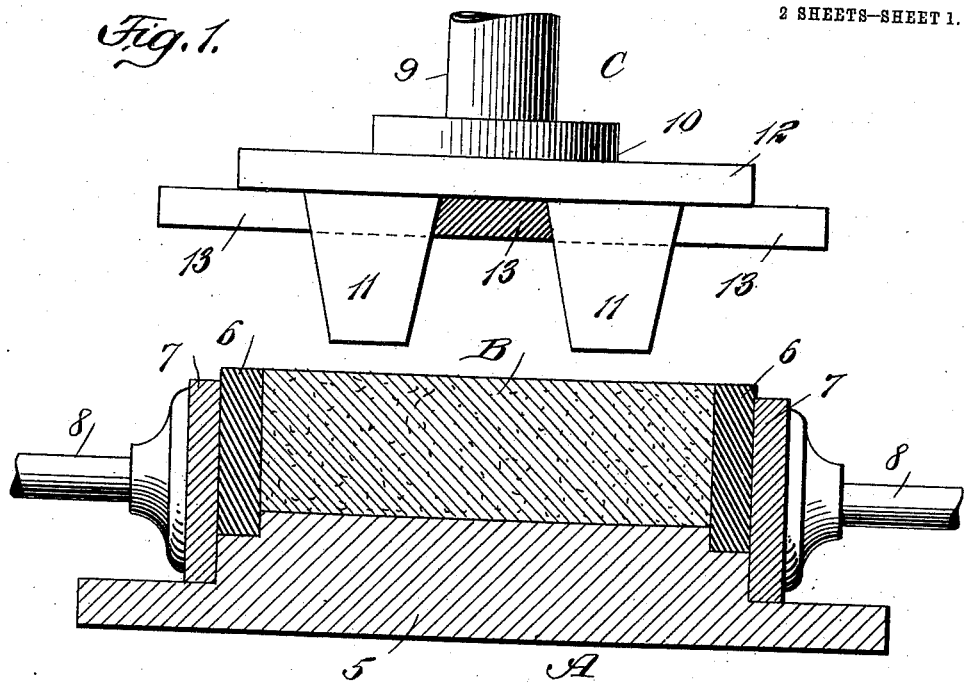
Figure 2:
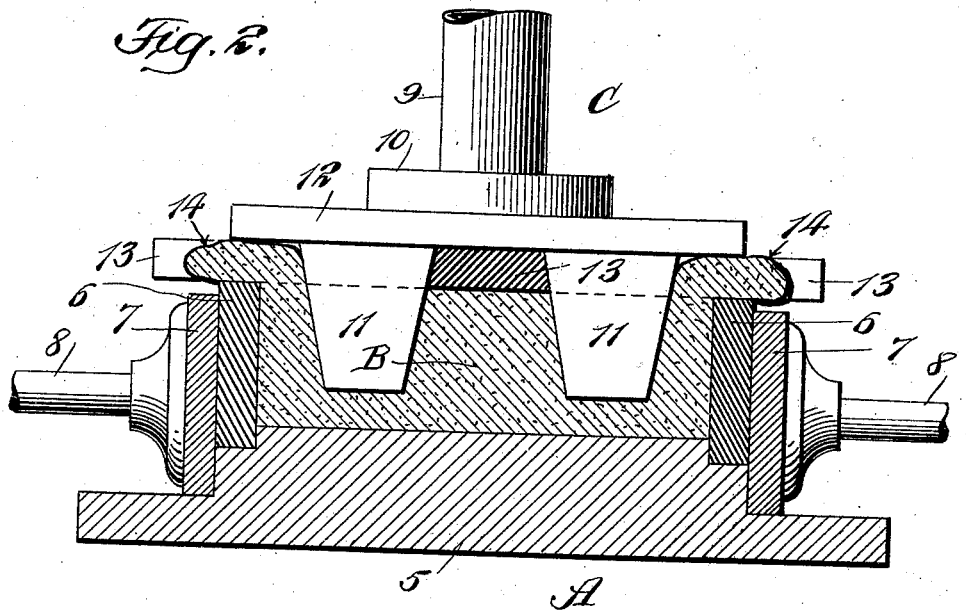
Figure 3:
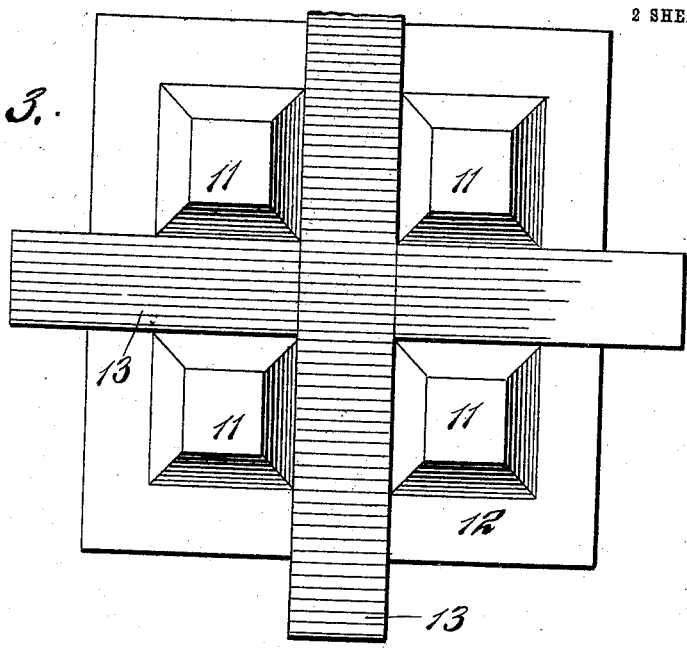
Figure 4:
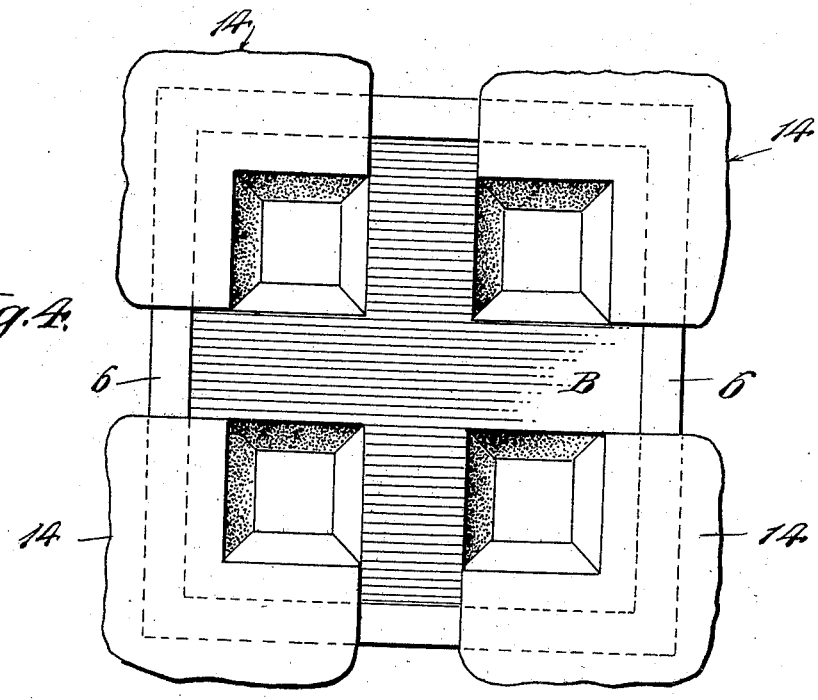

In the accompanying drawings Figure 1 is a view partly in elevation and partly in section, showing the plunger in an elevated position and ready to be lowered into contact with the mass of material to be molded. Fig. 2 is a similar view showing the plunger in its molding position relative to the material, the escape or overflow of the surplus material at the sides of the mold-box being also shown. Fig. 3 is a plan view of the face of the plunger and showing the relative location of the strips or plates, which I locate between the dies or projections on the plunger head and which lie above the webs or partitions of the block during the process of molding, as shown in Figs. 2 and 4. Fig. 4 is a plan view of a pressed block upon removal of the plunger of Fig. 3 when the press has been made with the use of strips as shown on Fig. 3.

In carrying out my invention I preferably proceed as follows: I employ a mold-box or receptacle indicated as an entirety by the letter A, said receptacle preferably comprising a base member 5, the side walls 6 of plaster of Paris, or other suitable material, and the reinforcing or outside walls 7, preferably of plate-like form, and held in position by any suitable means, such as by the arms 8. These reinforcing plates or side walls are particularly useful for taking up the strains or stresses encountered in the molding operation. The material, such as the clay or terra cotta, is indicated at B and any suitable amount of such material is placed in the mold-box A. The plunger for molding material is indicated as an entirety by C, and comprises the stem 9 carrying a head 10. This head is formed with any suitable number of dies or projections 11, suitably spaced apart so that the material, in the process of molding, may enter such spaces to form the webs or partitions. The block 12 of the head to which the dies or projections are secured, and which when in the position shown in Fig. 2, that is with the mold in relationship relative to the material, forms to all intents and purposes the top plate of the mold, said block 12 being of dimensions approximately the same as those of the mold-box. When manufacturing the block the material is placed in the mold as shown in Fig. 5, and suitable strips or cleats 13 are placed to lie between the spaces formed by the dies or projections 11, so that when the plunger is lowered or forced into the material as shown in Fig. 2, these strips or cleats will overlie the tops of the webs or partitions of the block being molded and tend to compress and confine the web so that any surplus material, instead of flowing or being forced up as far as the plate 12 of the head of the plunger, will be forced to flow around toward the edge of the mold, the surplus material finding relief and escape over the edge as is indicated at 14 in Fig. 2. When the block has been sufficiently molded the plunger is elevated and the strips may then be taken off from over the partitions of the block. By pursuing this method of manufacture the liability of damaging or injuring the block is obviated, the webs are firmly and durably molded and the surplus material which overlaps the edge of the mold may be easily, quickly and evenly removed by drawing or wiping a wire or the like around the edge of the mold-box.

In the accompanying drawings I have, by way of illustration, shown a plunger having four dies or projections, but it will of course be understood that said plunger may have any number of projections, or may be of any suitable form, and further, that other means may be employed in place of the strips across the top of the webs, without departing from the spirit or scope of the invention.

What I claim is:

1. An apparatus of the class described, comprising a receptacle for the material to be molded, a plunger having a plurality of separate projections adapted to enter one open receptacle for the formation of a single block, means to force said projections into the material and a strip between the projections which at the completion of the stroke will lie between the receptacle and the plunger face whereby overflow passages will at all times be maintained around the edge of the receptacle.

2. An apparatus of the class described, comprising a receptacle for the material to be molded, a plunger having separate projections, means to force said projections into the material and a strip between the projections which at the completion of the stroke will lie between the receptacle and the plunger face whereby overflow passages will at all times be maintained around the edge of the receptacle, said strip being separable from the plunger whereby it may be held down upon the withdrawal of the projections from the material.

In testimony whereof I have signed my name in the presence of two subscribing witnesses.

WILLIAM D. FRERICHS.

Witnesses:
R. B. CAVANAGH,
T. E. HARDENBERGH, Jr.

---

Copies of this patent may be obtained for five cents each, by addressing the "Commissioner of Patents, Washington, D. C."